United States Patent Office 3,532,744
Patented Oct. 6, 1970

3,532,744
1- AND 2-AMINO SUBSTITUTED INDANE AND TETRALENE CARBOXYLIC ACIDS
Horace Fletcher III, Pottstown, Peter B. Russell, Villanova, and Harvey E. Alburn, West Chester, Pa., assignors to American Home Products Corporation, New York, N.Y., a corporation of Delaware
No Drawing. Filed July 28, 1967, Ser. No. 656,673
Int. Cl. C07c *101/04*
U.S. Cl. 260—518                                       4 Claims

ABSTRACT OF THE DISCLOSURE

The compounds are: aromatic-alicyclic N-carboxyanhydrides useful for reacting with 6-aminopenicillanic acid to prepare penicillins having antibiotic activity; corresponding amino carboxylic acids useful as intermediates in the preparation of said N-carboxyanhydrides; and similarly corresponding hydantoins useful as intermediates in the preparation of said amino carboxylic acids.

BACKGROUND OF THE INVENTION

This invention relates generally to the production of N-carboxyanhydrides, and more particularly to certain aromatic-alicyclic N-carboxyanhydrides, which may be reacted with 6-aminopenicillanic acid in the preparation of penicillins having antibiotic activity; to the production of corresponding amino carboxylic acids, which are useful as intermediates in the preparation of said N-carboxyanhydrides; and to similarly corresponding hydantoins, which, in turn, are useful as intermediates in the preparation of said amino carboxylic acids; all as defined hereinafter.

DESCRIPTION OF THE INVENTION

We have discovered a new series of aromatic-alicyclic hydantoins which are useful as intermediates in preparing a similarly novel series of amino carboxylic acids.

The novel aromatic-alicyclic hydantoins of the present invention, when considered in their broadest aspects, include those compounds encompassed within the following structural formula:

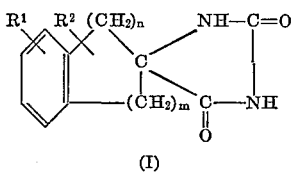

(I)

wherein $R^1$ and $R^2$ are selected from the group consisting of hydrogen, lower alkyl, lower alkoxy, phenyl and phenyloxy; $n$ is an integer from 0 to 1; $m$ is an integer from 1 to 3, with the proviso that when $n$ is 0, $m$ is always from 2 to 3.

Generally, the novel aromatic-alicyclic hydantoins (I) of the invention may be prepared by known procedures for making aromatic-alicyclic hydantoins generally. For example, a suitable α-indanone or tetralone may be heat-reacted with ammonium carbonate and potassium cyanide in an inert organic solvent. The reaction mixture may be cooled, poured into water and acidified to pH 2 with concentrated hydrochloric acid, for example. The crude product may then be dissolved in diluted sodium hydroxide, filtered, and the filtrate re-acidified. The final pure product may then be obtained by filtering and drying.

The novel amino carboxylic acids of the present invention, when considered in their broadest aspects, include those compounds encompassed within the following structural formula:

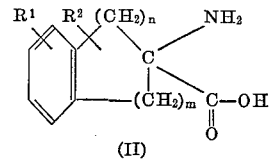

(II)

wherein $R^1$, $R^2$, $n$ and $m$ have the same meanings described with respect to Formula I above.

Generally, the novel amino acids (II) of the invention may be prepared by refluxing the hydantoins (I) obtained as above in the presence of potassium hydroxide under nitrogen, adjusting to pH to 2 with concentrated hydrochloride acid, for example, and the mixture filtered. The filtrate may be adjusted to pH 6 as by addition of concentrated ammonium hydroxide, at which time the amino carboxylic acid crystallizes from solution.

The novel N-carboxyanhydrides of the present invention, when considered in their broadest aspects, include those compounds encompassed within the following structural formula:

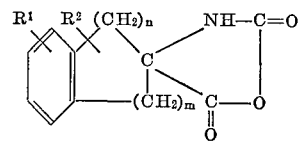

(III)

wherein $R^1$, $R^2$, $n$ and $m$ again have the same meanings described with respect to Formulae I and II.

Generally, the novel N-carboxyanhydrides (III) of the invention may be prepared by reacting the amino acid (II) obtained as above, with phosgene under anhydrous conditions. After addition of a low boiling solvent medium, such as an ether-ethylacetate system, reduction of the temperature of the resulting solution results in slow crystallization of the product therefrom.

The N-carboxyanhydrides (III) may then be reacted with 6-aminopenicillanic acid to prepare the corresponding antibiotically active penicillin derivates in accordance with the procedures set forth in U.S.P. 3,194,802 for example.

Several of the starting compounds which may be employed in the preparatory procedure referred to above for making the hydantoins (I) are known compounds which are readily available from commercial sources. Others, which are not commercially available, can easily be prepared in accordance with standard organic procedures well known to those skilled in the art.

The following examples are illustrative of the invention, but are not to be considered as necessarily limitative thereof.

EXAMPLE 1

(A) Preparation of spiro (imidazolidine-4, 1¹-indane)-2, 5-dione

α=indanone 6.7 g. (.0515 mole), potassium cyanide 4.5 g. (0.069 mole), and ammonium carbonate .2H₂O 14.4 g. (0.126 mole) were dissolved in 110 ml. of formamide, and the solution was heated in a steel bomb at 110° C. for 20 hours. After cooling, the solution was diluted with 600 ml. of water, and acidified to pH 2 with concentrated HCl. The crude product was dissolved in 200 ml. of 5% NaOH, treated with activated carbon and acidified with concentrated HCl. The dry product weighed 5.75 g. (56% yield).

(B) Preparation of 1-aminoindanecarboxylic acid

Spiro (imidazolidine-4, 1¹-indane)-2, 5-dione, 23.1 g. (0.114 mole), was refluxed in 230 ml. of 20% KOH for 72 hours under nitrogen. The solution was acidified to pH 2 with concentrated HCl, treated with activated carbon and readjusted to pH 6 with aqueous sodium hydroxide. The crude product was filtered and dissolved in 125 ml. of boiling water and chilled. The product which crystallized from the solution had a melting point of 290–294° C.

*Analysis.*—Theory (percent): N, 7.90. Found (percent): N, 7.95.

(C) Preparation of the N-carboxyanhydride of 1-aminoindane-carboxylic acid

The amino acid obtained in (B) above, (0.2 mole), was stirred in 400 ml. of anhydrous dioxane under anhydrous conditions. The suspension was heated to 60° C. and phosgene gas was passed in for one hour. The temperature was then raised to 90° C. and phosgene was passed in for three hours. The solution was then swept with dry nitrogen overnight and was evaporated in vacuo to an oil. Low boiling petroleum ether (300 ml.) was added and 10 ml. of ethyl acetate was used to make a clear solution which was then stored at 0° C. Crystallization was very slow. The N-carboxyanhydride (NCA) was obtained in 54% yield after two crystallizations from the described ethyl acetate-petroleum ether system. The melting point was 152–153° C.

*Analysis.*—Theory (percent): C, 65.02; H, 4.47; N, 6.89. Found (percent): C, 65.16; H, 4.54; N, 6.91.

This NCA was used to react with 6-aminopenicillanic acid in accordance with the procedure described in said U.S.P. 3,194,802 to make the corresponding penicillin which was antibiotically active.

EXAMPLE 2

(A) Preparation of the 3′,4′-dihydro-6′-methoxyspiro-[imidazolidine-4,1′(2H)-naphthalene]-2,5-dione 6-methoxytetralone, 8.8 g. (0.05 mole), KCN, 4.5 g. (0.07 mole), and $(NH_4)_2CO_3$, 14.4 g. (0.126 mole), were dissolved in 110 ml. of formamide in a steel bomb and heated at 110° C. for 20 hours. The reaction was cooled and the mixture was poured into 500 ml. of water and acidified to pH 2 with concentrated HCl. The crude product was dissolved in dilute NaOH, treated with activated carbon, filtered, and the filtrate re-acidified. The pure product was filtered and dried. Yield: 90%, M.P. 219–220° C.

(B) Preparation of 1-amino-6-methoxytetralincarboxylic acid

The hydantoin obtained above, 49.25 g. (0.2 mole), was refluxed in 400 ml. of $20_B$ KOH for 72 hours under nitrogen. The pH was adjusted to 2 with concentrated $NH_4OH$. The amino acid crystallized and was filtered, washed with water, and dried. Yield: 40.4 g., 91%, M.P. 217° C., dec.

*Analysis.*—Theory (percent): N, 6.33. Found (percent): N, 6.59.

(C) Preparation of the N-carboxyanhydride of 1-amino-6-methoxytetralincarboxylic acid The amino acid obtained in (B) above, 29 g. (0.132 mole), was converted to the N-carboxyanhydride (NCA) by the procedure used in Example 1(C). Yield: 20.0 g., 61%, M.P. 142–145° C., dec.

*Analysis.*—Theory (percent): N, 5.65. Found (percent): N, 5.58.

This compound was used to make the corresponding antibiotically active penicillin by the procedure of said U.S.P. 3,194,802.

EXAMPLE 3

(A) Preparation of spiro(imidazolidine-4,2′-indane)-2,5-dione 2-indanone, 10 g. (0.076 mole), ammonium bicarbonate, 15 g. (0.19 mole), and ammonium hydroxide, 79 ml. of 15 N (0.19 mole), were stirred in 420 ml. of 70% v./v. aqueous ethanol and heated to 55° C. A solution of potassium cyanide, 7.4 g. (0.113 mole), in 150 ml. of water was added over 30 minutes and the resulting solution was heated for 3 hours more. The temperature was then raised and ethanol and ammonium carbonate were allowed to boil out until the internal temperature was 90° C. After cooling, the solution was acidified to pH 2 with concentrated hydrochloric acid and the gummy precipitate was redissolved in 300 ml. of 5% aqueous sodium hydroxide. The solution was treated with activated charcoal, extracted twice with 150 ml. of ether, acidified with concentrated hydrochloric acid, and filtered. The dried product weighed 3.5 g. (23% yield), M.P. 260–262° C.

(B) Preparation of 2-aminoindane-2-carboxylic acid

Spiro(imidazolidine-4,1′-indane)-2,6-dione, 55–75 g. (0.273 mole), $Ba(OH)_2 \cdot 8H_2O$, 215 g. (0.683 mole), and 300 ml. of water were heated in a steel bomb at 200° C. for 20 hours. After cooling, the mixture was dissolved by adding concentrated HCl to pH 2 and warming. The solution was filtered to remove a black tar, and 38 ml. of concentrated $H_2SO_4$ (0.683 mole) was added to the filtrate. The slurry was heated on a steam bath for 30 minutes and filtered. The filtrate was evaporated to dryness in vacuo and the residue was dissolved in 100 ml. of water and was adjusted to pH 4.5 with dilute NaOH. The product crystallized on chilling. Yield: 16.0 g., M.P. 291–293° C.

Calcd. (percent): C, 67.78; H, 6.26; N, 7.91. Found (percent): C, 67.42; H, 6.08; N, 8.38.

(C) Preparation of the NCA of 2-aminoindane-2-carboxylic acid 2-aminoindane-2-carboxylic acid, 11.9 g. (0.068 mole), was suspended in 250 ml. of anhydrous dioxane and heated to 90° C., as a stream of phosgene was introduced. The reaction was continued for 4 hours, the phosgene was stopped, and dry nitrogen was passed through the solution overnight. The dioxane was evaporated and the residue was crystallized from ethyl acetate and petroleum ether. Yield: 8.0 g., 58%, M.P. 156–157° C.

Calcd. (percent): C, 65.0; H, 4.4; N, 6.9. Found (percent): C, 64.91; H, 4.53; N, 6.97.

EXAMPLE 4

Utilizing the procedures of Examples 2(A), (B) and (C) and the starting materials given in Table I below, the corresponding hydantoins, amino acids and N-carboxyanhydrides, also given in said table, are obtained:

TABLE I

| Starting material | Hydantoin | Amino acid | N-Carboxyanhydride (NCA) |
| --- | --- | --- | --- |
| 5-butyl-α-indanone | 5′-butylspiro (imidazolidine-4,1′-indane)-2,5-dione. | 1-amino-5-butyl-indane carboxylic acid. | NCA of 1-amino-5-butyl-a-indane carboxylic acid. |
| 5-butoxy-tetralone | 5′-butoxy-3′,4′-dihydrospiro [imidazolidine-4,1′(2H)-naphthalene]-2,5-dione. | 1-amino-5-butoxy-tetralene carboxylic acid. | NCA of 1-amino-5-butoxy-tetralene carboxylic acid. |
| 4-phenyl-α-indanone | 4′-phenylspiro (imidazolidine-4,1′-indane)-2,5-dione. | 1-amino-4-phenyl-indane carboxylic acid. | NCA of 1-amino-4-phenyl-α-indane carboxylic acid. |
| 6-phenoxy-tetralene | 3′,4′-dihydro-6′-phenoxyspiro [imidazolidine-4,1′(2H)-naphthalene]-2,5-dione. | 1-amino-6-methyl-tetralene carboxylic acid. | NCA of 1-amino-6-phenoxytetralene carboxylic acid. |
| 5-methyl-2-indanone | 5′-methylspiro (imidazolidine-4,2′-indane)-2,5-dione. | 2-amino-5-methyl-2-indane 2-carboxylic acid. | NCA of 2-amino-5-methyl-2-indane-2-carboxylic acid. |
| 4-ethoxy-2-indanone | 4′-ethoxyspiro (imidazolidine-4,2′-indane)-2,5-dione. | 2-amino-4-ethoxy-2-indane-2-carboxylic acid. | NCA of 2-amino-4-ethoxy-2-indane-2-carboxylic acid. |

As in the case of the preceding examples, the NCA's of the table above, on reaction with 6–APA, result in the production of the corresponding penicillins, which are antibiotically active.

We claim:

1. An amino carboxylic acid of the formula:

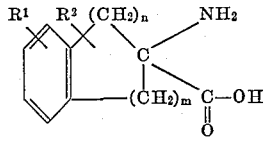

wherein $R^1$ and $R^2$ are selected from the group consisting of hydrogen, lower alkyl, lower alkoxy, phenyl and phenyloxy; $n$ is an integer from 0 to 1; and $m$ is an integer from 1 to 3, with the proviso that when $n$ is 0, $m$ is always from 2 to 3.

2. An amino carboxylic acid as defined in claim 1, which is 1-aminoindanecarboxylic acid.

3. An amino carboxylic acid as defined in claim 1, which is 2-aminoindane-2-carboxylic acid.

4. An amino carboxylic acid as defined in claim 1, which is 1-amino-6-methoxytetralincarboxylic acid.

References Cited

UNITED STATES PATENTS 3,345,405   10/1967   Burger _____ 260—518

JAMES A. PATTEN, Primary Examiner

L. A. THAXTON, Assistant Examiner

U.S. Cl. X.R.

260—239.1, 307, 309.5, 519, 999